United States Patent
Onogi et al.

(10) Patent No.: US 12,338,552 B2
(45) Date of Patent: Jun. 24, 2025

(54) COMPOSITE FIBER

(71) Applicant: KURARAY CO., LTD., Kurashiki (JP)

(72) Inventors: Shoji Onogi, Osaka (JP); Takayuki Ikeda, Kurashiki (JP); Shinya Kawakado, Saijo (JP); Hitoshi Nakatsuka, Saijo (JP)

(73) Assignee: KURARAY CO., LTD., Kurashiki (JP)

( * ) Notice: Subject to any disclaimer, the term of this patent is extended or adjusted under 35 U.S.C. 154(b) by 704 days.

(21) Appl. No.: 17/299,369

(22) PCT Filed: Dec. 4, 2019

(86) PCT No.: PCT/JP2019/047333
§ 371 (c)(1),
(2) Date: Jun. 3, 2021

(87) PCT Pub. No.: WO2020/129629
PCT Pub. Date: Jun. 25, 2020

(65) Prior Publication Data
US 2022/0025553 A1 Jan. 27, 2022

(30) Foreign Application Priority Data
Dec. 21, 2018 (JP) ................. 2018-240135

(51) Int. Cl.
*D01F 8/16* (2006.01)
*C08L 53/02* (2006.01)
*C08L 75/04* (2006.01)
*D01F 6/28* (2006.01)
*D01F 6/70* (2006.01)

(52) U.S. Cl.
CPC ............. *D01F 8/16* (2013.01); *C08L 53/02* (2013.01); *C08L 75/04* (2013.01); *D01F 6/28* (2013.01); *D01F 6/70* (2013.01); *C08L 2203/12* (2013.01); *C08L 2205/03* (2013.01); *C08L 2205/06* (2013.01)

(58) Field of Classification Search
CPC ..... D01F 6/70; D01F 6/28; D01F 6/30; D01F 6/08–42; D01F 8/04–18; D10B 2401/06–061
See application file for complete search history.

(56) References Cited

U.S. PATENT DOCUMENTS

| | | | |
|---|---|---|---|
| 2004/0171765 A1* | 9/2004 | Tsuji | C08G 18/10 |
| | | | 525/452 |
| 2005/0118419 A1* | 6/2005 | Kwon | D02G 3/48 |
| | | | 428/364 |
| 2014/0342629 A1 | 11/2014 | Nakatsuka et al. | |

FOREIGN PATENT DOCUMENTS

| | | | |
|---|---|---|---|
| JP | 2556649 B2 | | 11/1996 |
| JP | 2003049321 A | * | 2/2003 |
| JP | 2003129330 A | * | 5/2003 |
| JP | 2009228150 A | | 10/2009 |
| JP | 2015193953 A | * | 11/2015 |
| JP | 2016108703 A | | 6/2016 |
| JP | 6195715 B2 | | 9/2017 |
| WO | WO-2013115094 A1 | | 8/2013 |

OTHER PUBLICATIONS

"JP2003049321_Machine Translation" is a machine translation of JP-2003049321-A. (Year: 2003).*
"JP2015193953_Machine Translation" is a machine translation of JP-2015193953-A (Year: 2015).*
"JP2003129330_Machine Translation" is a machine translation of JP-2003129330-A (Year: 2003).*
International Preliminary Report on Patentability and Written Opinion with English translation issued Jun. 16, 2021 in PCT/JP2019/047333, 17 pages.
International Search Report issued Feb. 25, 2020 in PCT/JP2019/047333 (with English translation), 7 pages.
Extended European Search Report issued Sep. 12, 2023 in Patent Application No. 19900004.3, 8 pages.

* cited by examiner

*Primary Examiner* — Larissa Rowe Emrich
(74) *Attorney, Agent, or Firm* — Element IP, PLC

(57) ABSTRACT

The present invention relates to a composite fiber for obtaining a fiber having a strength at 100% elongation of 0.04 cN/dtex or less,
wherein the composite fiber is composed of component X comprising a polyvinyl-based thermoplastic elastomer, or a thermoplastic polyurethane elastomer having a glass transition temperature of 0° C. or lower, and component Y which is an easily soluble thermoplastic polymer,
wherein the composite ratio (mass ratio) X:Y of the component X and the component Y is within the range of from 90:10 to 50:50, and
wherein the composite fiber has a core-sheath structure in which the component X constitutes the core component, and the component Y constitutes the sheath component, in a cross section of the fiber.

5 Claims, No Drawings

COMPOSITE FIBER

TECHNICAL FIELD

The present invention relates to a composite fiber having a core-sheath structure, a fiber obtained by dissolving and removing the sheath component from the composite fiber, a fabric including the composite fiber or the fiber, and a method of producing the fiber or the fabric.

BACKGROUND ART

Cloth worn on the human body, particularly, members for physical assistance to be worn during exercise or work, inner wear and the like are required to provide a comfortable wearing feel, conforming to the movement of the body. Conventionally, fibers and fabrics based on various types of polymer materials have been developed, in order to provide cloth having such a comfortable wearing feel. For example, Patent Document 1 discloses a composite fiber in which a polyurethane elastomer which constitutes the core component and has a glass transition temperature within the range of from 25 to 45° C. is coated with an easily soluble thermoplastic polymer.

PRIOR ART DOCUMENTS

Patent Documents

Patent Document 1: JP 6195715 B

SUMMARY OF THE INVENTION

Problems to be Solved by the Invention

However, in composite fibers such as one disclosed in the Patent Document described above, a high stress is generated during elongation, and thus, a relatively large force is required for elongation. This may cause the feeling of difficulty to move or an excessive tightening feel when worn on the human body. Therefore, such composite fibers have not always been suitable as fibers for forming, for example, members for physical assistance which are worn during exercise or work during which expansion and contraction are repeated many times, inner wear for body shape correction in which a natural wearing feel is required while providing a moderate tightening feel, and the like.

An object of the present invention is to provide a fiber and a fabric which can be elongated with a small force, which have an excellent elasticity and a high flexibility, and which are capable of achieving a natural wearing feel while providing a moderate tightening feel, when worn. Another object of the present invention, in addition to the object described above, is to provide a fiber and a fabric in which unrecoverable elongation (a state in which the fiber or the fabric is fully stretched and loses its elasticity) does not easily occur, even when used in clothing which is subjected to repeated expansion and contraction.

Solution to Problem

The present inventors and others have arrived at the present invention, as a result of intensive studies to solve the above mentioned problems. That is, the present invention includes the following preferred embodiments.

[1] A composite fiber for obtaining a fiber having a strength at 100% elongation of 0.04 cN/dtex or less, wherein the composite fiber is composed of component X comprising a polyvinyl-based thermoplastic elastomer, or a thermoplastic polyurethane elastomer having a glass transition temperature of 0° C. or lower, and component Y which is an easily soluble thermoplastic polymer, wherein the composite ratio (mass ratio) X:Y of the component X and the component Y is within the range of from 90:10 to 50:50, and wherein the composite fiber has a core-sheath structure in which the component X constitutes the core component, and the component Y constitutes the sheath component, in a cross section of the fiber.

[2] The composite fiber according to the above [1], wherein the easily soluble thermoplastic polymer is at least one selected from a polyvinyl alcohol-based polymer and an easily soluble polyester-based polymer.

[3] The composite fiber according to the above [1] or [2], wherein the component X is made of a resin composition comprising the polyvinyl-based thermoplastic elastomer, and wherein the resin composition comprises at least the following 1) and 2):
1) 100 parts by mass of at least one selected from:
   a block copolymer (A) composed of a polymer block(s) a) containing at least two vinyl aromatic compounds as a main component(s), and a polymer block(s) b) containing at least one conjugated diene compound as a main component, wherein from 50 to 100% by mass of the block copolymer (A) has a weight average molecular weight of 200,000 or less; and
   a block copolymer (A') obtained by hydrogenating the block copolymer (A); and
2) from 50 to 300 parts by mass of a softener for a hydrocarbon-based rubber.

[4] The composite fiber according to any one of the above [1] to [3], wherein the composite fiber has a single fiber fineness of from 0.3 to 50 dtex.

[5] A fabric comprising the composite fiber according to any one of the above [1] to [4], in at least a part thereof.

[6] A fiber which comprises a polyvinyl-based thermoplastic elastomer, or a thermoplastic polyurethane elastomer having a glass transition temperature of 0° C. or lower, and which has a strength at 100% elongation of 0.04 cN/dtex or less.

[7] The fiber according to the above [6], wherein the fiber has an elongation modulus, as measured after repeating the test three times in accordance with JIS L 1096 (method B-1), of 95% or more.

[8] A fabric comprising the fiber according to the above [6] or [7], in at least a part thereof.

[9] A method of producing the fiber according to the above [6] or [7],
wherein the composite fiber according to any one of the above [1] to [4] is used in at least a part thereof, and
wherein the method comprises the step of dissolving and removing an easily soluble thermoplastic polymer (component Y) included in the composite fiber.

[10] A method of producing the fabric according to the above [8],
wherein the composite fiber according to any one of the above [1] to [4] is used in at least a part thereof, and
wherein the method comprises the step of dissolving and removing the easily soluble thermoplastic polymer (component Y) included in the composite fiber.

Effects of the Invention

According to the present invention, it is possible to provide a fiber and a fabric which can be elongated with a small force, which have an excellent elasticity and a high flexibility, and which are capable of achieving a natural wearing feel while providing a moderate tightening feel, when worn. Further, it is possible to provide, in addition to the effect described above, a fiber and a fabric in which unrecoverable elongation does not easily occur, even when used in clothing which is subjected to repeated expansion and contraction.

DESCRIPTION OF EMBODIMENTS

Embodiments of the present invention will now be described in detail. The scope of the present invention is not limited to the embodiments described herein, and various modifications can be made without departing from the spirit of the present invention.

Composite Fiber

The composite fiber according to the present invention is a composite fiber for obtaining a fiber having a strength at 100% elongation of 0.04 cN/dtex or less. More specifically, the composite fiber according to the present invention is a composite fiber composed of a core component comprising a polyvinyl-based thermoplastic elastomer, or a thermoplastic polyurethane elastomer having a glass transition temperature of 0° C. or lower, and a sheath component which is an easily soluble thermoplastic polymer, wherein a fiber obtained by dissolving and removing the easily soluble thermoplastic polymer has a strength at 100% elongation of 0.04 cN/dtex or less.

The core component (component X) which constitutes the composite fiber according to the present invention comprises a polyvinyl-based thermoplastic elastomer, or a thermoplastic polyurethane elastomer having a glass transition temperature of 0° C. or lower. The inclusion of such a thermoplastic elastomer in the core component enables to obtain, after dissolving and removing the easily soluble thermoplastic polymer (component Y) to be described later, a fiber which can be elongated with a small force, and which has a high elasticity and flexibility like those of rubber.

In the present invention, examples of the polyvinyl-based thermoplastic elastomer include: a block copolymer containing a polymer block based on a vinyl aromatic compound and a polymer block based on a conjugated diene-based compound, within the molecule, and a hydrogenated product thereof; and a resin composition obtained by adding any of various types of softeners for hydrocarbon-based rubbers to the polymer described above.

The polyvinyl-based thermoplastic elastomer preferably has a glass transition temperature lower than the air temperature, more preferably has a glass transition temperature of 0° C. or lower, and still more preferably −10° C. or lower. When the polyvinyl-based thermoplastic elastomer has a glass transition temperature lower than the air temperature, it is possible to reduce the stress in the fiber when elongated at normal temperature, which is the temperature of the general living environment, and to obtain a fiber which shows a high elongation with a smaller force. The lower limit of the glass transition temperature of the polyvinyl-based thermoplastic elastomer is usually −70° C. or higher, and preferably −50° C. or higher, but not particularly limited thereto. In the present invention, the glass transition temperature of the polyvinyl-based thermoplastic elastomer may be the glass transition temperature of the elastomer itself, or may be the glass transition temperature of the polymer portion which constitutes the elastomer. The glass transition temperature can be measured by the differential scanning calorimetry method (DSC).

In the present invention, the polyvinyl-based thermoplastic elastomer preferably has a melt viscosity at 250° C. of less than 700 poise, more preferably 650 poise or less, and preferably 300 poise or more, more preferably 350 poise or more. When the polyvinyl-based thermoplastic elastomer has a melt viscosity at 250° C. of equal to or lower than the upper limit value described above, spinning can be performed at a low temperature, allowing for a high yield spinning. Further, when the melt viscosity is equal to or higher than the lower limit value described above, the strength of the resulting fiber can be ensured. The melt viscosity can be measured, for example, using a capillary rheometer.

As the polyvinyl-based thermoplastic elastomer which forms the core component of the composite fiber, in the present invention, a block copolymer containing a polymer block based on a vinyl aromatic compound and a polymer block based on a conjugated diene-based compound, within the molecule, and a hydrogenated product thereof are preferred, because a fiber which can be elongated with a smaller force and which has an excellent elasticity and flexibility can be obtained. More preferred are a block copolymer (hereinafter also referred to as "block copolymer (A)") composed of a polymer block(s) a) containing at least two vinyl aromatic compounds as a main component(s), and a polymer block(s) b) containing at least one conjugated diene compound as a main component, and a block copolymer (A') obtained by hydrogenating the block copolymer (A). Still more preferred is the block copolymer (A').

In the block copolymer (A), the polymer block(s) a) containing vinyl aromatic compounds as a main component(s) may comprise not only a polymer block consisting of vinyl aromatic compounds, but also a polymer block obtained by polymerization of a monomer mixture mainly composed of vinyl aromatic compounds. In the present specification, the expression "containing vinyl aromatic compounds as a main component(s)" or "mainly composed of vinyl aromatic compounds" means that the structural units derived from vinyl aromatic compounds in the polymer block(s) a) account for more than 50% by mole. Examples of the vinyl aromatic compounds which constitute the block copolymer (A) include styrene, a-methylstyrene, o-methylstyrene, m-methylstyrene, p-methylstyrene, dimethylstyrene, vinylnaphthalene and vinylanthracene. Among these compounds, styrene and a-methylstyrene are preferred, and styrene is more preferred. These vinyl aromatic compounds may be used singly, or in combination of two or more kinds thereof.

The content of the vinyl aromatic compounds in the block copolymer (A) is preferably 5 to 75% by mass, more preferably 5 to 50% by mass, based on the total mass of the block copolymer (A). When the content of the vinyl aromatic compounds in the block copolymer (A) is within the range described above, it is possible to improve the rubber elasticity of a fiber obtained from the composite fiber according to the present invention, and to obtain a fiber in which unrecoverable elongation does not easily occur even when subjected to repeated expansion and contraction.

In the block copolymer (A), the polymer block(s) b) containing a conjugated diene-based compound as a main component may comprise not only a polymer block consisting of a conjugated diene-based compound(s), but also a polymer block obtained by polymerization of a monomer mixture mainly composed of a conjugated diene-based compound(s). In the present specification, the expression "containing a conjugated diene-based compound as a main component" or "mainly composed of a conjugated diene-based compound(s)" means that the structural units derived from the conjugated diene-based compound(s) in the polymer block(s) b) account for more than 50% by mole. Examples of the conjugated diene-based compound(s) which constitute the block copolymer (A) include butadiene, isoprene, 2,3-dimethyl-1,3-butadiene, 1,3-pentadiene and 1,3-hexadiene. These conjugated diene-based compounds may be used singly, or in combination of two or more kinds thereof. In particular, the conjugated diene-based compound is preferably at least one selected from isoprene and butadiene, and more preferably a mixture of isoprene and butadiene. In cases where a mixture of isoprene and butadiene is used as the conjugated diene-based compounds, the form of copolymerization of the polymer block b) may be random, tapered, block or a combination thereof.

The block copolymer (A) is required to have at least one each of the polymer block a) and the polymer block b). From the viewpoint of heat resistance, mechanical properties and the like, however, the block copolymer (A) preferably has two or more polymer blocks a), and one or more polymer blocks b). The binding mode of the polymer block(s) a) and the polymer block(s) b) may be linear, branched, or any combination thereof. When the polymer block a) is indicated as a' and the polymer block b) is indicated as b', the block copolymer (A) may be, for example, a copolymer having a triblock structure represented by a'-b'-a', or a multi-block copolymer represented by (a'-b')n or (a'-b')n-a' (wherein n represents an integer of 2 or more). In particular, a copolymer having a triblock structure represented by a'-b'-a' is particularly preferred from the viewpoints of the heat resistance, mechanical properties, handleability and the like.

In the case of forming the composite fiber according to the present invention, it is preferred that some or all of carbon-carbon double bonds derived from the conjugated diene-based compound(s) in the polymer block(s) b), in the block copolymer (A), be hydrogenated. The block copolymer (A') obtained by hydrogenating the block copolymer (A) preferably has a hydrogenation rate of 50% or more, more preferably 75% or more, and still more preferably 95% or more. The hydrogenation rate may be 100%. When the hydrogenation rate is equal to or higher than the lower limit described above, it is possible to improve the heat resistance or the weather resistance of the composite fiber, and to improve stability against heating during spinning or heating during the formation of the composite fiber.

The block copolymer (A) preferably has a weight average molecular weight of from 40,000 to 500,000, more preferably from 45,000 to 400,000, and still more preferably from 50,000 to 300,000. When the block copolymer has a weight average molecular weight within the range described above, a good formability is more easily ensured, without causing a decrease in the mechanical properties of the thermoplastic elastomer.

In particular, it is preferred that from 50 to 100% by mass of the block copolymer (A) have a weight average molecular weight of 200,000 or less. When from 50 to 100% by mass of the block copolymer (A) has a weight average molecular weight of 200,000 or less, the resulting fiber has a high rubber elasticity, and the occurrence of unrecoverable elongation can be reduced even when the fiber is subjected to repeated expansion and contraction. In the present invention, it is more preferred that from 80 to 100% by mass of the block copolymer (A) have a weight average molecular weight of 200,000 or less. The weight average molecular weight can be determined using gel permeation chromatography (GPC).

In the present invention, the thermoplastic polyurethane elastomer which may constitute the core component (component X) of the composite fiber has a glass transition temperature of 0° C. or lower. The use of the thermoplastic polyurethane elastomer having a glass transition temperature of 0° C. or lower enables to reduce the stress in the fiber when elongated at normal temperature, which is the temperature of the general living environment, and to obtain a fiber which shows a high elongation with a smaller force. The glass transition temperature of the thermoplastic polyurethane elastomer is preferably −5° C. or lower, and more preferably −10° C. or lower. The lower limit value of the glass transition temperature is not particularly limited, but is usually −70° C. or higher, and preferably −50° C. or higher.

The thermoplastic polyurethane elastomer having a glass transition temperature of 0° C. or lower is a thermoplastic polyurethane obtained by the reaction of a high-molecular-weight diol, an organic diisocyanate and a chain extender, and any of those conventionally known can be used without particular limitation, as long as the glass transition temperature thereof is 0° C. or lower.

Examples of the high-molecular-weight diol which can be used in the production of the thermoplastic polyurethane elastomer include polyether diols, polyester diols, polycarbonate diols and polyester ether diols. The thermoplastic polyurethane elastomer can be formed using one kind or two or more kinds of these high-molecular-weight diols, and specific examples thereof include polyethylene glycol, polypropylene glycol, polytetramethylene glycol, 1,4-butanediol, 1,5-pentanediol, 1,6-hexanediol and 1,8-octanediol. Among these high-molecular-weight diols, polyether diols are preferred, and polytetramethylene glycol is particularly preferred, from the viewpoints of the weather resistance and cost.

Examples of the organic diisocyanate which can be used in the production of the thermoplastic polyurethane elastomer include aromatic diisocyanates, alicyclic diisocyanates and aliphatic diisocyanates. Specific examples thereof include 4,4'-diphenylmethane diisocyanate, toluene diisocyanate, p-phenylene diisocyanate, xylylene diisocyanate, naphthalene diisocyanate, isophorone diisocyanate and hexamethylene diisocyanate. Among these organic diisocyanates, 4,4'-diphenylmethane diisocyanate is preferred from the viewpoint of the cost.

As the chain extender which can be used in the production of the thermoplastic polyurethane elastomer, it is possible to use any of the chain extenders conventionally used in the production of thermoplastic polyurethane elastomers. Examples of the chain extender include aliphatic diols, alicyclic diols and aromatic diols, but not particularly limited thereto. Specific examples thereof include ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol and 1,4-bis(β-hydroxyethoxy)benzene. Among these chain extenders, 1,4-butanediol is preferred from the viewpoint of the cost.

In the present invention, the thermoplastic polyurethane elastomer can be synthesized by reacting the high-molecular-weight diol, the chain extender and the organic diisocyanate at an appropriate ratio. The ratio of these components can be determined as appropriate, and the thermoplastic polyurethane elastomer can be synthesized, for example, by reacting these components at a molar ratio of the high-molecular-weight diol: the chain extender:the organic diisocyanate, of 11:2 to 10:2 to 10. At this time, the method of synthesizing the thermoplastic polyurethane elastomer is not particularly limited, and can be produced using a known urethanization reaction. If necessary, any of various types of additives, for example, a delustering agent (light-shielding agent) such as titanium oxide or zinc oxide, an antioxidant and/or an ultraviolet absorber may be added.

In the present invention, a commercially available thermoplastic polyurethane elastomer may be used as the thermoplastic polyurethane elastomer having a glass transition temperature of 0° C. or lower. Examples of such a commercially available product include "PANDEX (registered trademark)" manufactured by DIC Covestro polymer Ltd., "MIRACTRAN (registered trademark)" manufactured by Nippon Miractran Co., Ltd., and "ELASTOLLAN (registered trademark)" manufactured by BASF Japan Ltd.

In the present invention, the core component (component X) which constitutes the composite fiber preferably includes a polyvinyl-based thermoplastic elastomer. More preferably, the component X is made of a resin composition comprising a polyvinyl-based thermoplastic elastomer, and the resin composition comprises at least the following 1) and 2):
  1) 100 parts by mass of at least one selected from:
    a block copolymer (A) composed of a polymer block(s)
      a) containing at least two vinyl aromatic compounds as a main component(s), and a polymer block(s) b) containing at least one conjugated diene compound as a main component, wherein from 50 to 100% by mass of the block copolymer (A) has a weight average molecular weight of 200,000 or less; and
    a block copolymer (A') obtained by hydrogenating the block copolymer (A); and
  2) from 50 to 300 parts by mass of a softener for a hydrocarbon-based rubber. By including a polyvinyl-based thermoplastic elastomer in the core component, particularly, by constituting the core component with a resin made of the resin composition containing the 1) and 2) described above, a fiber obtained from the composite fiber according to the present invention shows a high elongation with a small force, and is capable of achieving a high effect of reducing the occurrence of unrecoverable elongation when the fiber is subjected to repeated expansion and contraction.

Examples of the softener for a hydrocarbon-based rubber which can be used in the resin composition include: process oils such as paraffinic oils, naphthenic oils and aromatic oils; and liquid paraffins. Among these softeners, process oils such as paraffinic oils and naphthenic oils are preferred. These softeners can be used singly, or in combination of two or more kinds thereof.

In cases where the core component (component X) of the composite fiber according to the present invention is made of the resin composition described above, the content of the softener for a hydrocarbon-based rubber in the resin composition is preferably from 50 to 300 parts by mass, more preferably from 60 to 200 parts by mass, and still more preferably from 60 to 150 parts by mass, with respect to 100 parts by mass of the block copolymer (A) and/or the block copolymer (A'). When the content of the softener for a hydrocarbon-based rubber is within the range described above, a fiber having a good rubber elasticity can be obtained.

The resin composition which can be used to form the core component (component X) of the composite fiber according to the present invention may comprise, in addition to the block copolymer (A) and/or the block copolymer (A') and the softener for a hydrocarbon-based rubber, another (co)polymer, an antiblocking agent, a thermal stabilizer, an antioxidant, a photostabilizer, an ultraviolet absorber, a lubricant, a crystal nucleating agent, a foaming agent, a colorant and/or the like, as necessary, as long as the effects of the present invention are not adversely affected.

In the composite fiber according to the present invention, the cooling rate of the component X during the process of forming the composite fiber is reduced, by coating the core component (component X) comprising a specific thermoplastic elastomer described above, with an easily soluble thermoplastic polymer as the sheath component (component Y). As a result, the molecular orientation of the component X tends to decrease. This causes a decrease in the degree of orientation of the component X which will be finally used as a fiber, resulting in a lower Young's modulus or stress during elongation. Therefore, as compared to the case in which the thermoplastic elastomer forming the component X is used as a fiber as it is, the fiber obtained by dissolving and removing the component Y can be elongated with an extremely small force, has an excellent elasticity and a high flexibility, and maintains advantageous properties inherent in the thermoplastic elastomer. As a result, it is possible to provide a fiber and a fabric capable of achieving a natural wearing feel while providing a moderate tightening feel, when worn. Further, as compared to the case in which the thermoplastic elastomer as the component X is spun singly to produce a fabric, the process passability (namely, the ability to go through a process smoothly) in the fiber-forming process and the process(es) after the fiber formation will be improved, and it is expected to achieve a high-yield production. In addition, since the component X is coated with the component Y, unraveling of the composite fibers can be performed easily during processing, making it advantageous in terms of the productivity of a fiber, a fabric or the like using the composite fiber, as well.

The sheath component (component Y) which constitutes the composite fiber according to the present invention is an easily soluble thermoplastic polymer. In the present invention, the term "easily soluble (or easily decomposable) thermoplastic polymer" refers to a thermoplastic polymer which is melt-spinnable, and which has a characteristic of being relatively easily dissolved or decomposed in a solvent or a chemical agent, compared to the thermoplastic elastomer included in the component X. For example, the easily soluble thermoplastic polymer is preferably capable of being dissolved or decomposed by water (including warm water), an alkali, and an acid or the like.

In the present invention, specific examples of the easily soluble thermoplastic polymer include polyvinyl alcohol-based polymers and easily soluble polyester-based polymers. The easily soluble thermoplastic polymer is preferably at least one selected from a polyvinyl alcohol-based polymer and an easily soluble polyester-based polymer. These easily soluble thermoplastic polymers may be used singly, or in combination of two or more kinds thereof.

It is preferred to use a polyester which has a high alkali dissolution rate, as the easily soluble polyester-based polymer. For example, a polar group-containing copolymerized polyester, an aliphatic polyester or the like can be used.

Examples of the polar group-containing copolymerized polyester include a copolymerized polyester obtained by the copolymerization of: from 1 to 5% by mole of an ester-forming sulfonic acid metal salt compound (such as 5-sodium sulfoisophthalic acid or 5-potassiumsulfoisophthalic acid); from 5 to 30% by mass of a polyalkylene glycol (for example, a poly($C_{1-4}$ alkylene glycol) such as polypropylene glycol or polyethylene glycol); and a diol component and a dicarboxylic acid component which are conventionally used.

Examples of the aliphatic polyester include polylactic acid; polyesters of aliphatic diols and aliphatic carboxylic acids, such as poly(ethylene succinate), poly(butylene succinate) and poly(butylene succinate-co-butylene adipate); polyhydroxycarboxylic acids such as poly(glycolic acid), poly(3-hydroxybutyric acid), poly(3-hydroxyvaleric acid) and poly(6-hydroxycaproic acid); and poly(ω-hydroxyalkanoate)s such as poly(ε-caprolactone) and poly(δ-valerolactone). Among these aliphatic polyesters, polylactic acid is preferred, and polylactic acid may be poly(D-lactic acid), poly(L-lactic acid) or a mixture thereof.

The easily soluble polyester-based polymer is preferably a polyester easily soluble in an alkali, such as one which almost completely dissolves (decomposes), for example, within 60 minutes, preferably within 45 minutes, more preferably within 30 minutes, and particularly preferably within 15 minutes, when immersed, for example, in a 2% aqueous solution of sodium hydroxide at 100° C. at a bath ratio of 1:30.

As a polyvinyl alcohol-based polymer which is an easily soluble thermoplastic polymer soluble in water, preferred is a polyvinyl alcohol having, for example, a viscosity average degree of polymerization of from 200 to 500, a degree of saponification of from 90 to 99.99% by mole (preferably, from 95 to 99% by mole), and a melting point of from 160 to 230° C. The polyvinyl alcohol-based polymer may be a homopolymer or a copolymer. However, it is preferred to use a copolymerized polyvinyl alcohol in which from 0.1 to 20% by mole (preferably from 5 to 15% by mole) thereof is modified, for example, with an α-olefin having 4 or less carbon atoms, such as ethylene or propylene, from the viewpoints of melt spinnability, water solubility and physical properties of the fiber.

The polyvinyl alcohol-based polymer is preferably a thermoplastic polyvinyl alcohol-based polymer, such as one which almost completely dissolves (decomposes), for example, within 60 minutes, preferably within 45 minutes, more preferably within 30 minutes, and particularly preferably within 15 minutes, when immersed, for example, in hot water at 100° C. at a bath ratio of 1:30. The polyvinyl alcohol-based polymer is more preferably a copolymerized polyvinyl alcohol modified with an α-olefin.

<Method of Producing Composite Fiber>

The composite fiber according to the present invention can be produced by determining the combination of the component X and the component Y, and then performing fiber formation using a conventionally known composite spinning apparatus. For example, the composite fiber can be produced by an arbitrary yarn production method such as, for example: a method of performing melt spinning at a low speed or a medium speed, followed by drawing; a method of performing direct spinning and drawing at a high speed; or a method of performing spinning, followed by drawing and false twisting simultaneously or sequentially.

In the composite fiber according to the present invention, the composite ratio (mass ratio) X:Y of the component X and the component Y is within the range of from 90:10 to 50:50. When the proportion of the component X is too high, the effect of reducing the degree of orientation of the component X, which is provided by having a core-sheath structure, is less likely to be obtained, making it difficult to sufficiently reduce the stress during elongation. Further, there are cases where the processability in the fiber-forming process, particularly, the process passability in the product production process is deteriorated, because the adhesion of fibers occurs after forming and winding the fibers. On the other hand, when the proportion of the component Y is too high, the cooling rate of the component X during the composite fiber-forming process is reduced, resulting in poor spinnability. Further, the molecular orientation of the component X may be excessively low, possibly resulting in a failure to provide a comfortable wearing feel when worn on the human body. In the composite fiber according to the present invention, the composite ratio (mass ratio) X:Y of the component X and the component Y is more preferably within the range of from 85:15 to 50:50, and still more preferably from 80:20 to 50:50.

In a cross section of the composite fiber according to the present invention, the entire fiber surface need not be coated with the component Y. However, in order to ensure the winding processability in the fiber-forming process, the handleability after winding, and the process passability in the product production process, it is important, in the fiber cross section, that the component X constitutes the core, and 70% or more of the entire circumference of the component X is coated with the component Y. More preferably, 80% or more, and particularly preferably 90% or more, of the entire circumference of the component X is coated with the component Y.

The composite form of the composite fiber according to the present invention may be any of a concentric type, an eccentric type and a multi-core type, as long as the component Y can be dissolved and removed by an alkali treatment, water treatment or the like, and the occurrence of cracks in the component X can be prevented. Further, in the fiber cross section, the component X may have a circular cross-sectional shape, or may have a heteromorphic cross-sectional shape, such as a triangle, a flat shape or a multi-leaf-like shape. It is also possible to form a hollow portion in the interior of the component X. The component X may have any of various types of cross-sectional shapes, such as, for example, a single-hole hollow shape, or a multi-hole hollow shape with two or more holes.

The single fiber fineness of the composite fiber according to the present invention can be set as appropriate depending on the purpose. The single fiber fineness can be selected, for example, within the range of from 0.3 to 50 dtex, and preferably from 0.3 to 40 dtex, from the viewpoints of facilitating the production of the composite fiber and improving the spinnability. Further, from the viewpoint of improving the well-fitting feel on the human body, the single fiber fineness is preferably from 0.3 to 10 dtex, and more preferably from 0.3 to 5 dtex. The composite fiber according to the present invention enables to produce a fine fiber having a fineness of 6 dtex or less, while preventing fiber breakage. Such a fiber can be used not only in the form of long fibers, but also in the form of short fibers or short-cut fibers.

The single fiber fineness can be calculated by measuring the total fineness of the composite fiber in accordance with JIS L 1013, and dividing the measured value by the number of filaments.

The composite fiber according to the present invention is a composite fiber for obtaining a fiber having a strength at 100% elongation of 0.04 cN/dtex or less, and a fiber obtained by dissolving and removing the component Y has a strength at 100% elongation of 0.04 cN/dtex or less. When the fiber obtained from the composite fiber according to the present invention has a strength at 100% elongation of more than 0.04 cN/dtex, the force required for the elongation of the fiber tends to increase, making it more likely to cause the feeling of difficulty to move or an excessive tightening feel, when worn on the human body as clothing. In the present invention, the fiber obtained from the composite fiber preferably has a strength at 100% elongation of 0.035 cN/dtex or less, more preferably 0.03 cN/dtex or less, and still more preferably 0.025 cN/dtex or less. A lower strength at 100% elongation of the resulting fiber leads to a smaller force required for elongation of the fiber, enabling to achieve a more natural wearing feel when worn on the human body as clothing. Accordingly, although the lower limit value is not particularly limited, the strength at 100% elongation of the fiber is usually 0.004 cN/dtex or more, and preferably 0.008 cN/dtex or more, from the viewpoint of providing a moderate elasticity and tightening feel. The strength at 100% elongation of the fiber can be determined, as will be described in the Examples to be described later, by dissolving and removing the easily soluble thermoplastic polymer from the composite fiber according to the present invention, and then performing the measurement and calculation in accordance with the method defined in JIS L 1013 (tensile strength).

A fiber having a strength at 100% elongation of 0.04 cN/dtex or less, such as one obtained from the composite fiber according to the present invention, can be elongated with an extremely small force, has an excellent elasticity and a high flexibility, and is suitable for producing a fabric capable of achieving a natural wearing feel while providing a moderate tightening feel, when worn. Therefore, the present invention also encompasses a fiber which comprises a polyvinyl-based thermoplastic elastomer, or a thermoplastic polyurethane elastomer having a glass transition temperature of 0° C. or lower, and which has a strength at 100% elongation of 0.04 cN/dtex or less.

The fiber according to the present invention can be produced, for example, by a production method in which the following composite fiber is used in at least a part thereof, and which comprises the step of dissolving and removing the easily soluble thermoplastic polymer (component Y) which constitutes the composite fiber. The composite fiber to be used in this production method is a composite fiber composed of component X including a polyvinyl-based thermoplastic elastomer, or a thermoplastic polyurethane elastomer having a glass transition temperature of 0° C. or lower, and component Y which is an easily soluble thermoplastic polymer, wherein the composite ratio (mass ratio) X:Y of the component X and the component Y is within the range of from 90:10 to 50:50, and wherein the composite fiber has a core-sheath structure in which the component X constitutes the core component, and the component Y constitutes the sheath component, in a cross section of the fiber.

Examples of the polyvinyl-based thermoplastic elastomer, or the thermoplastic polyurethane elastomer having a glass transition temperature of 0° C. or lower, which constitutes the fiber according to the present invention, include the same thermoplastic elastomers as those exemplified above as the component X which constitute the composite fiber according to the present invention. Further, examples of the easily soluble thermoplastic polymer which constitutes the composite fiber for obtaining the fiber according to the present invention include the same thermoplastic polymers as those exemplified above as the component Y which constitute the composite fiber according to the present invention. The composite fiber for obtaining the fiber according to the present invention can be produced, for example, by the same method as that described above as the method of producing the composite fiber according to the present invention.

In the method of producing the fiber according to the present invention, the step of dissolving and removing the easily soluble thermoplastic polymer, which is the component Y (sheath component), is not particularly limited, as long as the step is carried out by a method and under conditions in which the component Y can be completely dissolved or decomposed without affecting the component X, which will be finally obtained as a fiber. The step may be selected as appropriate depending on the types of the component X and the component Y, the composite ratio of the component X and the component Y, and the like. Specifically, it is possible to use, for example, solutions and conditions for dissolution and removal exemplified in the description of the component Y which constitutes the composite fiber according to the present invention.

The fiber according to the present invention has a strength at 100% elongation of 0.04 cN/dtex or less, preferably 0.035 cN/dtex or less, more preferably 0.03 cN/dtex or less, and still more preferably 0.025 cN/dtex or less. When the fiber has a strength at 100% elongation of more than 0.04 cN/dtex, the force required for the elongation of the fiber tends to increase, making it more likely to cause the feeling of difficulty to move or an excessive tightening feel, when worn on the human body as clothing. A lower strength at 100% elongation of the resulting fiber leads to a smaller force required for elongation of the fiber, enabling to achieve a more natural wearing feel when worn on the human body as clothing. Accordingly, although the lower limit value is not particularly limited, the strength at 100% elongation of the fiber according to the present invention is usually 0.004 cN/dtex or more, and preferably 0.008 cN/dtex or more, from the viewpoint of providing a moderate elasticity and tightening feel.

In one preferred embodiment of the present invention, the fiber preferably has an elongation modulus, as measured after repeating the test three times in accordance with JIS L 1096 (method B-1) of 95% or more, and more preferably 98% or more. The elongation modulus may be 100%. When the elongation modulus is equal to or higher than the lower limit value described above, unrecoverable elongation of the fiber does not easily occur when the fiber is repeatedly expanded and contracted. Further, the elasticity inherent in the fiber can be maintained and a high elasticity can be exhibited continuously, even when used in clothing which is subjected to repeated expansion and contraction. The elongation modulus as described above is more easily achieved, when the fiber according to the present invention is formed including the polyvinyl-based thermoplastic elastomer, particularly when the fiber is made of a resin composition containing:

1) 100 parts by mass of at least one selected from:
   a block copolymer (A) composed of a polymer block(s)
      a) containing at least two vinyl aromatic compounds as a main component(s), and a polymer block(s) b) containing at least one conjugated diene compound as a main component, wherein from 50 to 100% by mass of the block copolymer (A) has a weight average molecular weight of 200,000 or less; and
   a block copolymer (A') obtained by hydrogenating the block copolymer (A); and
2) from 50 to 300 parts by mass of a softener for a hydrocarbon-based rubber.

The composite fiber according to the present invention and the fiber according to the present invention can be used in fabrics such as various types of woven and knitted fabrics, and nonwoven fabrics. Therefore, the present invention encompasses a fabric comprising the composite fiber according to the present invention in at least a part thereof, and a fabric comprising the fiber according to the present invention in at least a part thereof. The fabric comprising the composite fiber according to the present invention in at least a part thereof is usually used as a final product to be used on the human body, after dissolving and removing the component Y. In the present invention, the fabric described above can be produced, for example, by a production method in which the composite fiber according to the present invention is used in at least a part thereof, and which comprises the step of dissolving and removing the easily soluble thermoplastic polymer (component Y) which constitutes the composite fiber.

The fabric comprising the composite fiber or the fiber according to the present invention may be formed using the composite fiber or the fiber according to the present invention alone. However, the above fabric may also be a woven or knitted fabric, or a nonwoven fabric, in which the composite fiber or the fiber according to the present invention is used in a part thereof, for example, a mixed woven fabric with another fiber(s) such as a natural fiber, a chemical fiber and/or a synthetic fiber, or alternatively, may be a woven or knitted fabric, or a cotton-mixed nonwoven fabric, in which the composite fiber or the fiber according to the invention is used as a blended spun yarn or a mixed yarn. For example, in the case of a combined use with another fiber(s), the proportion of the component X of the composite fiber according to the present invention with respect to the total mass of the resulting woven or knitted fabric, or the resulting nonwoven fabric, may be, for example, 5% by mass or more, preferably 14% by mass or more, more preferably 15% by mass or more, still more preferably 18% by mass or more, and particularly preferably 23% by mass or more, but not particularly limited thereto. Further, in the case of using as a blended spun yarn or a mixed yarn, the proportion of the component X in the resulting yarn may be, for example, from 14 to 95% by mass, preferably 20% by mass or more, preferably 30% by mass or more, and still more preferably 40% by mass or more.

A fabric comprising the fiber according to the present invention, and a fabric obtained by removing the component Y from the fabric comprising the composite fiber according to the present invention, can be elongated with a small force, have an excellent elasticity and a high flexibility, and are capable of achieving a natural wearing feel while providing a moderate tightening feel, when worn. Further, the use of the composite fiber used in the present invention enables to control the single fiber fineness of the thermoplastic elastomer fiber constituting the fabric, for example, within the range of from 0.3 to 50 dtex, and preferably from 0.3 to 40 dtex. In the case of forming a fine fiber, it is possible to obtain a fine fiber having a fineness as low as from 0.3 to 10 dtex, and preferably from 0.3 to 5 dtex.

The fabric comprising the composite fiber or the fiber according to the present invention can be subjected to a nap raising treatment, such as nap raising with a card clothing, or any other finishing treatment, as necessary, after being subjected to the process of forming a fabric.

EXAMPLES

The present invention will now be described based on Examples. It is noted, however, that the present invention is in no way limited to the following Examples.

1. Composite Fibers
(1) Constituent Components

The component X and the component Y used in the Examples and Comparative Examples are as follows.

<Component X>
Polyvinyl-based elastomer: EARNESTON (registered trademark) CJ101, manufactured by Kuraray Plastics Co., Ltd.; a compound of: a hydrogenated block copolymer of a styrene-isoprene/butadiene-styrene type triblock copolymer, and a styrene-isoprene-styrene type triblock copolymer (selected within the range of weight average molecular weight of from 50,000 to 200,000; melt viscosity at 250° C.: 480 poise; glass transition temperature: −35° C.); and a softener for a hydrocarbon-based rubber.
Polyurethane-based elastomer 1: PANDEX T-8175N, manufactured by DIC Covestro polymer Ltd.; glass transition temperature: about −45° C.
Polyurethane-based elastomer 2: a polyurethane elastomer was prepared in accordance with the description of Example 4 in JP 6195715 B. Glass transition temperature: 35° C.

<Component Y>
Modified PVA: a modified polyvinyl alcohol (EXCEVAL), manufactured by Kuraray Co., Ltd.; degree of saponification: 98.5; ethylene content: 8.0% by mole; degree of polymerization: 380
Easily soluble polyester: polyethylene terephthalate obtained by copolymerizing 8% by mole of polyethylene glycol having a molecular weight of 2,000 and 5% by mole of 5-sodium sulfoisophthalic acid; intrinsic viscosity [η]: 0.52
Polylactic acid: 6200D, manufactured by Cargill Dow LLC (2) Production of Composite Fibers Examples 1 to 5 and Comparative Examples 3 to 5

Composite fibers of Examples 1 to 5 and Comparative Examples 3 to 5 were each prepared in accordance with the following method. The component X (core component) and the component Y (sheath component) were each allowed to melt in a separate extruder, in accordance with the composition shown in Table 1, and the melted components were extruded from a composite spinning nozzle (spinneret) in the form of composite fiber filaments each having a core-sheath cross section. Subsequently, the filaments extruded from the spinneret were cooled using a side-blowing type cooling air device having a length of 1.0 m. The cooled filaments were then continuously introduced into a tube heater disposed at a position 1.3 m immediately below the spinneret and having a length of 1.0 m and an inner diameter of 30 mm, and drawn in the tube heater (inner wall temperature: 130° C.). Thereafter, a spinning oil was applied to the fiber filaments which had come out of the tube heater, followed by winding via rollers at a take-up rate of 2,000 m/min, to obtain the composite fiber of each of the Examples and Comparative Examples having the total fineness and the number of filaments shown in Table 1. As the spinning oil, an oil composed of an antistatic component containing no water, and a smoothing component was used.

(3) Production of Fibers (Method of Dissolution and Removal)

The composite fibers of Examples 1, 2 and 5 and Comparative Examples 3 to 5, in each of which the modified polyvinyl alcohol was used as the easily soluble thermoplastic polymer, and the composite fiber of Example 4, in which polylactic acid was used as the easily soluble thermoplastic polymer, were each immersed in hot water at 80° C. for 30 minutes, so that the component Y composed of the modified polyvinyl alcohol or polylactic acid was dissolved and removed. Further, the composite fiber of Example 3, in which the easily soluble polyester was used, was immersed in an aqueous alkaline solution (liquid temperature: 100° C.) containing 20 g/L of caustic soda for 30 minutes, at a bath ratio of 1:30, so that the component Y was selectively dissolved and removed. The dissolution and removal of the component Y was confirmed by changes in the weight.

(4) Comparative Examples 1 and 2

Fibers of Comparative Examples 1 and 2 were each prepared in accordance with the following method. The component X was allowed to melt in an extruder, in accordance with the composition shown in Table 1, and extruded from a spinning nozzle (spinneret) in the form of single-component fiber filaments. Subsequently, the filaments extruded from the spinneret were cooled using a side-blowing type cooling air device having a length of 1.0 m. Thereafter, a spinning oil was applied to the cooled filaments, followed by winding via rollers at a take-up rate of 100 m/min, to obtain the single-component fiber of each Comparative Example having the total fineness and the number of filaments shown in Table 1. As the spinning oil, an oil composed of an antistatic component containing no water, and a smoothing component was used.

2. Evaluation of Physical Properties and Characteristics of Fibers

The physical property values of each of the fibers of Examples and Comparative Examples were measured in accordance with the following methods. The respective results are shown in Table 1.

[Measurement of Strength at 100% Elongation]

The strength at 100% elongation was determined from a load-elongation curve obtained using an Instron type tensile tester, in accordance with JIS L 1013 (tensile strength). In the case of measuring a composite fiber, the measurement was carried out after dissolving and removing the easily soluble thermoplastic polymer.

[Elongation Modulus]

The elongation modulus was determined after repeating the test three times (after the third test) in accordance with JIS L 1096 (method B-1). In the case of measuring a composite fiber, the measurement was carried out after dissolving and removing the easily soluble thermoplastic polymer.

[Strength Retention Rate]

After dissolving and removing the easily soluble thermoplastic polymer, light irradiation was performed with a fade tester (UV Long-Life Fade Meter FAL-5H·B·BL, manufactured by Suga Test Instruments Co., Ltd., UV carbon arc lamp, 63° C.) for 100 hours. Thereafter, the strength retention rate was determined from a load-elongation curve obtained using an Instron type tensile tester, in accordance with JIS L 1013 (tensile strength).

Spinnability

For the composite fiber or the single-component fiber of each of the Examples 1 to 5 and Comparative Examples 1 to 5, the spinnability of the fiber when wound at each take-up rate described above was evaluated in accordance with the following criteria.

It was possible to continue winding for 12 hours without fiber breakage: ⊚

Although fiber breakage occurred 1 to 10 times during 12 hours, it was possible to perform winding: ○

Although fiber breakage occurred 11 to 20 times during 12 hours, it was possible to perform winding: Δ

Fiber breakage occurred 21 times or more during 12 hours, and it was difficult to perform continuous winding: ×

TABLE 1

| | Composite Fiber/Single-Component Fiber | | | | | | Fiber Properties (after dissolution and removal) | | |
|---|---|---|---|---|---|---|---|---|---|
| | Component X (core component) | | | Total | | | | | |
| | Type | Tg of Thermoplastic elastomer (° C.) | Component Y (sheath component) | X:Y (mass ratio) | Fineness (dtex)/ Number of Filaments | Single Fiber Fineness (dtex) | Spinnability | Strength at 100% Elongation (cN/dtex) | Elongation Modulus (%) | Strength Retention Rate (%) |
| Example 1 | Polyvinyl-based Elastomer | −35 | Modified PVA | 90:10 | 132/12 | 11 | ○ | 0.028 | 99.6 | 50.9 |
| Example 2 | Polyvinyl-based Elastomer | −35 | Modified PVA | 50:50 | 240/12 | 20 | ⊚ | 0.014 | 99.2 | 44.3 |
| Example 3 | Polyvinyl-based Elastomer | −35 | Easily Soluble Polyester | 50:50 | 240/12 | 20 | ⊚ | 0.015 | 99.9 | 45.1 |
| Example 4 | Polyvinyl-based Elastomer | −35 | Polylactic Acid | 50:50 | 240/12 | 20 | ⊚ | 0.014 | 99.8 | 46.0 |
| Example 5 | Polyurethane-based Elastomer 1 | −45 | Modified PVA | 50:50 | 240/12 | 20 | ⊚ | 0.019 | 83.0 | 3.2 |
| Comparative Example 1 | Polyvinyl-based Elastomer | −35 | — | — | 120/12 | 10 | × | 0.043 | 99.9 | — |
| Comparative Example 2 | Polyurethane-based Elastomer 1 | −45 | — | — | 132/12 | 11 | × | 0.053 | 89.7 | — |
| Comparative Example 3 | Polyvinyl-based Elastomer | −35 | Modified PVA | 95:5 | 126/12 | 10.5 | ○ | 0.061 | 99.1 | 49.9 |
| Comparative Example 4 | Polyvinyl-based Elastomer | −35 | Modified PVA | 30:70 | 198/6 | 33 | × | — | — | — |
| Comparative Example 5 | Polyurethane-based Elastomer 2 | 35 | Modified PVA | 60:40 | 240/12 | 20 | ⊚ | 0.319 | 89.3 | 54.4 |

It has been confirmed that each of the fibers (Example 1 to 5) obtained from the composite fibers according to the present invention is a fiber in which the strength at 100% elongation is low, and which can be elongated with a small force. Further, it has been confirmed that the use of the polyvinyl-based thermoplastic elastomer as the component X enables to obtain a fiber which exhibits a high recovery (elongation modulus) when subjected to repeated expansion and contraction, and which has a high durability (Example 1 to 4).

worn", which is counted as 2 points; "a slight tightening is felt", which is counted as 1 point; and "tightening is felt", which is counted as 0 point. The total points for each knitted fabric were calculated, and the wearing feel was evaluated in accordance with the following criteria.

⊚: The total points are 15 points or more

○: The total points are from 11 to 14 points

Δ: The total points are from 7 to 10 points x: The total points are 6 points or less

TABLE 2

| | Composite Fiber/Single-Component Fiber | | | | | Fabric | | | |
|---|---|---|---|---|---|---|---|---|---|
| | | | | | | Co-knitted Thread | | | |
| | Component X (core component) | Component Y (sheath component) | X:Y (mass ratio) | Total Fineness (dtex)/ Number of Filaments | Single Fiber Fineness (dtex) | Total Fineness (dtex)/ Number of Filaments | Knit Configuration (gauge) | Usage Rate of Component X with Respect to Fabric (%) | Evaluation of Wearing Feel |
| Example 6 | Polyvinyl-based Elastomer | Modified PVA | 50:50 | 120/6 | 20 | Ny-6 78/24 | Circular Knitting (18 gauge) | 43 | ⊚ |
| Example 7 | Polyvinyl-based Elastomer | Modified PVA | 50:50 | 60/3 | 20 | Ny-6 78/24 | Circular Knitting (18 gauge) | 28 | ○ |
| Example 8 | Polyvinyl-based Elastomer | Modified PVA | 50:50 | 60/3 | 20 | Ny-6 156/48 | Circular Knitting (18 gauge) | 16 | ○ |
| Example 9 | Polyvinyl-based Elastomer | Modified PVA | 50:50 | 40/3 | 13.3 | Ny-6 234/72 | Circular Knitting (18 gauge) | 7.8 | ○ |
| Example 10 | Polyvinyl-based Elastomer | Modified PVA | 50:50 | 40/3 | 13.3 | Ny-6 468/144 | Circular Knitting (18 gauge) | 4.1 | ○ |
| Comparative Example 6 | Polyvinyl-based Elastomer | — | — | 30/3 | 10 | Ny-6 156/48 | Circular Knitting (18 gauge) | 16 | Δ |
| Comparative Example 7 | Polyurethane-based Elastomer 1 | — | — | 30/3 | 10 | Ny-6 156/48 | Circular Knitting (18 gauge) | 16 | x |

3. Fabrics (1) Preparation of Fabrics

In Examples 6 to 10, in accordance with the compositions shown in Table 2, each composite fiber was prepared in the same manner as in Example 1, using the component X and the component Y in the mass ratio shown in Table 2. Thereafter, each resulting composite fiber and a Nylon thread (Ny-6) were simultaneously supplied to a circular knitting machine (18 gauge), to prepare a circular knitted fabric of each of Example 6 to 10. Each resulting circular knitted fabric was immersed in hot water at 80° C. for 30 minutes, and then allowed to pass through a tunnel setter at 160° C. for 1 minute, to obtain a fabric composed of the component X. In Comparative Example 6, a single-component fiber was prepared in the same manner as in Comparative Example 1, and in Comparative Example 7, a single-component fiber was prepared in the same manner as in Comparative Example 2. Thereafter, each resulting single-component and a Nylon thread were simultaneously supplied to a circular knitting machine (18 gauge), in the same manner as in Example 6, to prepare a circular knitted fabric of each of Comparative Examples 6 and 7.

(2) Evaluation of Wearing Feel

The sensory evaluation of the wearing feel of each resulting knitted fabric was carried out by 10 panelists. In the sensory evaluation, each panelist selected an answer from the following choices: "no tightening is felt when When the usage rate of the component X with respect to the entire fabric is 5% or more, a comfortable fabric which causes almost no tightening feel was obtained. Further, when the usage rate of the component X with respect to the entire fabric is 40% or more, it has been confirmed that the comfortability is markedly improved, and that a fabric in which the effects of the composite fiber according to the present invention can be sufficiently exhibited is obtained (Examples 6 to 10). On the other hand, tightening tends to be felt in the fabrics of Comparative Examples 6 and 7, confirming that these fabrics are those with discomfort.

The invention claimed is:

1. A fiber which comprises a polyvinyl-based thermoplastic elastomer having a melt viscosity at 250° C. of less than 700 poise, or a thermoplastic polyurethane elastomer having a glass transition temperature of 0° C. or lower, and which has a strength at 100% elongation of 0.025 cN/dtex or less.

2. The fiber according to claim 1, wherein the fiber has an elongation modulus, as measured after repeating a test three times in accordance with JIS L 1096 (method B-1), of 95% or more.

3. A fabric comprising the fiber according to claim 1, in at least a part thereof.

4. A method of producing the fiber according to claim 1, wherein the method comprises dissolving and removing an easily soluble thermoplastic polymer from a composite fiber composed of component X comprising a polyvinyl-based thermoplastic elastomer, or a thermoplastic polyurethane elastomer having a glass transition temperature of 0° C. or lower, and component Y which is the easily soluble thermoplastic polymer, wherein the composite ratio (mass ratio) X:Y of the component X and the component Y is within the range of from 90:10 to 50:50, and wherein the composite fiber has a core-sheath structure in which the component X constitutes the core component, and the component Y constitutes the sheath component, in a cross section of the fiber.

5. A method of producing the fabric according to claim 3, wherein the method comprises dissolving and removing the easily soluble thermoplastic polymer from a composite fiber composed of component X comprising a polyvinyl-based thermoplastic elastomer, or a thermoplastic polyurethane elastomer having a glass transition temperature of 0° C. or lower, and component Y which is the easily soluble thermoplastic polymer, wherein the composite ratio (mass ratio) X:Y of the component X and the component Y is within the range of from 90:10 to 50:50, and wherein the composite fiber has a core-sheath structure in which the component X constitutes the core component, and the component Y constitutes the sheath component, in a cross section of the fiber.

\* \* \* \* \*